(12) United States Patent
Li et al.

(10) Patent No.: US 8,763,369 B2
(45) Date of Patent: Jul. 1, 2014

(54) APPARATUS AND METHOD FOR REGENERATING AN EXHAUST FILTER

(75) Inventors: Jianwen Li, West Bloomfield, MI (US); Rahul Mital, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 12/754,893

(22) Filed: Apr. 6, 2010

(65) Prior Publication Data
US 2011/0239624 A1 Oct. 6, 2011

(51) Int. Cl.
*F01N 3/00* (2006.01)

(52) U.S. Cl.
USPC ............... 60/286; 60/274; 60/285; 60/299; 60/301

(58) Field of Classification Search
USPC ............... 60/274, 285–289, 295–301, 311
See application file for complete search history.

(56) References Cited

U.S. PATENT DOCUMENTS

| | | | | |
|---|---|---|---|---|
| 6,915,629 | B2 | 7/2005 | Szymkowicz | |
| 7,650,746 | B2 * | 1/2010 | Hu et al. | 60/286 |
| 7,814,747 | B2 * | 10/2010 | Bandl-Konrad et al. | 60/297 |
| 7,926,263 | B2 * | 4/2011 | Stroh et al. | 60/295 |
| 2003/0121249 | A1 * | 7/2003 | Foster et al. | 60/285 |
| 2006/0260296 | A1 * | 11/2006 | Theis | 60/286 |
| 2006/0272317 | A1 | 12/2006 | Brown et al. | |
| 2007/0079605 | A1 * | 4/2007 | Hu et al. | 60/295 |
| 2007/0082783 | A1 * | 4/2007 | Hu et al. | 477/100 |
| 2007/0175208 | A1 | 8/2007 | Bandl-Konrad et al. | |
| 2007/0256407 | A1 * | 11/2007 | Reuter | 60/286 |
| 2008/0016852 | A1 * | 1/2008 | Shamis et al. | 60/286 |
| 2008/0022661 | A1 * | 1/2008 | Yan | 60/286 |
| 2008/0053071 | A1 * | 3/2008 | Adams et al. | 60/286 |
| 2008/0066454 | A1 | 3/2008 | Viola | |
| 2008/0072575 | A1 * | 3/2008 | Yan | 60/284 |

(Continued)

FOREIGN PATENT DOCUMENTS

| | | |
|---|---|---|
| DE | 10300298 A1 | 1/2003 |
| DE | 102006025131 A1 | 5/2006 |
| DE | 102006009934 A1 | 9/2007 |
| DE | 102007044191 A1 | 4/2008 |

OTHER PUBLICATIONS

HC-SCR Catalyst Performance in Reducing NOx Emissions from a Diesel Engine Running Transient TEst Cycles, SAE Technical Paper Series, Rosemont, Illinois, Michael B. Viola, Oct. 6-9, 2008 pp. 1-10.

(Continued)

*Primary Examiner* — Jesse Bogue
(74) *Attorney, Agent, or Firm* — Cantor Colburn LLP

(57) ABSTRACT

An exhaust gas treatment system for an internal combustion engine comprises an exhaust gas conduit in fluid communication with the internal combustion engine to conduct the exhaust gas between a plurality of exhaust treatment devices. A hydrocarbon injector in fluid communication with the exhaust gas delivers hydrocarbon thereto. A selective catalyst reduction device is disposed downstream of the hydrocarbon injector and is configured to receive and mix the hydrocarbon and exhaust gas and to reduce components of $NO_x$ therein. An oxidation catalyst device is disposed in fluid communication with the exhaust gas conduit downstream of the selective catalyst reduction device and is configured to oxidize exhaust gas and hydrocarbon mixture to raise the temperature of the exhaust gas. A particulate filter assembly is located downstream of the oxidation catalyst device for receipt of the heated exhaust gas, and combustion of carbon and particulates collected in the exhaust gas filter.

16 Claims, 4 Drawing Sheets

(56) References Cited

U.S. PATENT DOCUMENTS

| | | | |
|---|---|---|---|
| 2008/0127638 A1* | 6/2008 | Vaarkamp et al. | 60/297 |
| 2009/0205322 A1* | 8/2009 | Braun et al. | 60/286 |
| 2009/0260346 A1* | 10/2009 | Gekas et al. | 60/274 |
| 2010/0050604 A1* | 3/2010 | Hoard et al. | 60/286 |
| 2010/0076666 A1* | 3/2010 | Yanakiev et al. | 701/103 |
| 2010/0077738 A1* | 4/2010 | Cavataio et al. | 60/301 |
| 2010/0132635 A1* | 6/2010 | McCarthy et al. | 123/3 |
| 2011/0005204 A1 | 1/2011 | Bandl-Konrad et al. | |

OTHER PUBLICATIONS

Chinese Office Action Dated Oct. 30, 2012 for Application No. 201110085037.5; 8 pages.

* cited by examiner

APPARATUS AND METHOD FOR REGENERATING AN EXHAUST FILTER

FIELD OF THE INVENTION

Exemplary embodiments of the present invention relate to exhaust gas treatment systems for internal combustion engines and, more particularly, to an efficient system for regeneration of an exhaust particulate filter.

BACKGROUND

The exhaust gas emitted from an internal combustion engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter. Catalyst compositions, typically disposed on catalyst supports or substrates disposed within the exhaust system of an internal combustion engine are provided to convert certain or all of these exhaust gas constituents into non-regulated exhaust gas components. For example, exhaust systems for internal combustion engines may include one or more of a precious metal containing oxidation catalyst ("OC") for the reduction of CO and engine-out HC, a selective catalyst reduction catalyst ("SCR") for the reduction of $NO_x$ and a particulate filter device ("PF") for the removal of particulate matter.

An exhaust gas treatment technology in use for high levels of particulate matter reduction, the PF may utilize one of several known exhaust gas filter structures that have displayed effectiveness in removing the particulate matter from the exhaust gas. Such exhaust gas filter structures may include, but are not limited to ceramic honeycomb wall flow filters, wound or packed fiber filters, open cell foams, sintered metal fibers, etc. Ceramic wall flow filters have experienced significant acceptance in automotive applications.

The exhaust gas filter is a physical structure for removing particulates from exhaust gas and, as a result, the accumulation of filtered particulates in the exhaust gas filter will have the effect of increasing backpressure in the exhaust system that is experienced by the internal combustion engine. To address backpressure increases caused by the accumulation of exhaust gas particulates in the exhaust gas filter, the PF is periodically cleaned, or regenerated. Regeneration of a PF in vehicle applications is typically automatic and is controlled by an engine or other suitable controller based on signals generated by engine and exhaust system sensors. The regeneration event involves increasing the temperature of the PF filter, typically by heating the engine exhaust gas, to levels that are often at or above 600° C. in order to burn the accumulates particulates.

One method of generating the exhaust gas temperatures required in the exhaust system for regeneration of the PF is to deliver unburned HC to an oxidation catalyst device disposed upstream of the PF. The HC may be delivered to the exhaust system by direct fuel injection into the exhaust system or may be achieved by "over-fueling" the internal combustion engine resulting in unburned HC's exiting the engine in the exhaust gas. The HC is oxidized in the oxidation catalyst device in an exothermic reaction that raises the temperature of the exhaust gas. The heated exhaust gas travels downstream to the PF and burns the particulate accumulation.

A disadvantage to this method of regeneration is that it is typically desirable to locate the $NO_x$ reduction device within the exhaust system at a location that is upstream of the PF in order to protect the device from high temperature excursions caused by PF regenerations. Similarly it is desirable to locate the $NO_x$ reduction device downstream of the OC to protect the sensitive SCR catalysts from poisoning by HC adsorption. If the OC is used to heat the exhaust gas, as described, during regeneration of the PF, $NO_x$ reduction across the $NO_x$ reduction device may be substantially reduced due to high temperatures generated by the oxidation of the HC in the OC. Additionally, thermal degradation of the $NO_x$ reduction device may be more pronounced resulting in rapid aging of the catalyst and lower than desired durability.

SUMMARY OF THE INVENTION

In an exemplary embodiment of the present invention, an exhaust gas treatment system for an internal combustion engine comprises an exhaust gas conduit in fluid communication with, and configured to receive an exhaust gas from, the internal combustion engine and to conduct the exhaust gas between a plurality of devices of the exhaust gas treatment system. A hydrocarbon injector is connected to the exhaust gas conduit and is in fluid communication with the exhaust gas therein for delivery of hydrocarbon thereto and formation of an exhaust gas and hydrocarbon mixture. A selective catalyst reduction device is disposed in fluid communication with the exhaust gas conduit downstream of the hydrocarbon injector and is configured to receive and to mix the exhaust gas and hydrocarbon mixture and to reduce the components of $NO_x$ in the exhaust gas. An oxidation catalyst device is disposed in fluid communication with the exhaust gas conduit downstream of the selective catalyst reduction device and is configured to oxidize exhaust gas and hydrocarbon mixture to raise the temperature of the exhaust gas. A particulate filter assembly, having an exhaust gas filter for collection of carbon and particulates disposed therein, is in fluid communication with the exhaust gas conduit and is located downstream of the second oxidation catalyst device for receipt of the heated exhaust gas, and combustion of carbon and particulates collected in the exhaust gas filter.

In another exemplary embodiment of the present invention, a method of operating an exhaust gas treatment system for an internal combustion engine comprising an exhaust gas conduit in fluid communication with, and configured to receive an exhaust gas from, the internal combustion engine and to conduct the exhaust gas between a plurality of devices of the exhaust gas treatment system, a hydrocarbon injector connected to the exhaust gas conduit in fluid communication with the exhaust gas for delivery of hydrocarbon thereto and formation of an exhaust gas and hydrocarbon mixture, a first oxidation catalyst device disposed in fluid communication with the exhaust gas conduit downstream of the hydrocarbon injector, a selective catalyst reduction device, configured for reduction of components of $NO_x$ in the exhaust gas, disposed in fluid communication with the exhaust gas conduit downstream of the first oxidation catalyst device, a second oxidation catalyst device disposed in fluid communication with the exhaust gas conduit downstream of the selective catalyst reduction device, and a particulate filter assembly having an exhaust gas filter for collection of carbon and particulates disposed therein, in fluid communication with the exhaust gas conduit and located downstream of the second oxidation catalyst device comprises delivering hydrocarbon to the exhaust gas through the hydrocarbon injector. Oxidizing a first portion of the hydrocarbon in the exhaust gas in the first oxidation catalyst to raise the temperature of the exhaust gas to a first temperature. Passing the exhaust gas through the selective catalyst reduction device and mixing it therein. Oxidizing a second portion of the hydrocarbon in the exhaust gas in the second oxidation catalyst to raise the temperature of the exhaust gas to a second temperature. And delivering the exhaust gas at the second temperature to the particulate filter assembly for combustion of carbon and particulates disposed on the exhaust gas filter.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
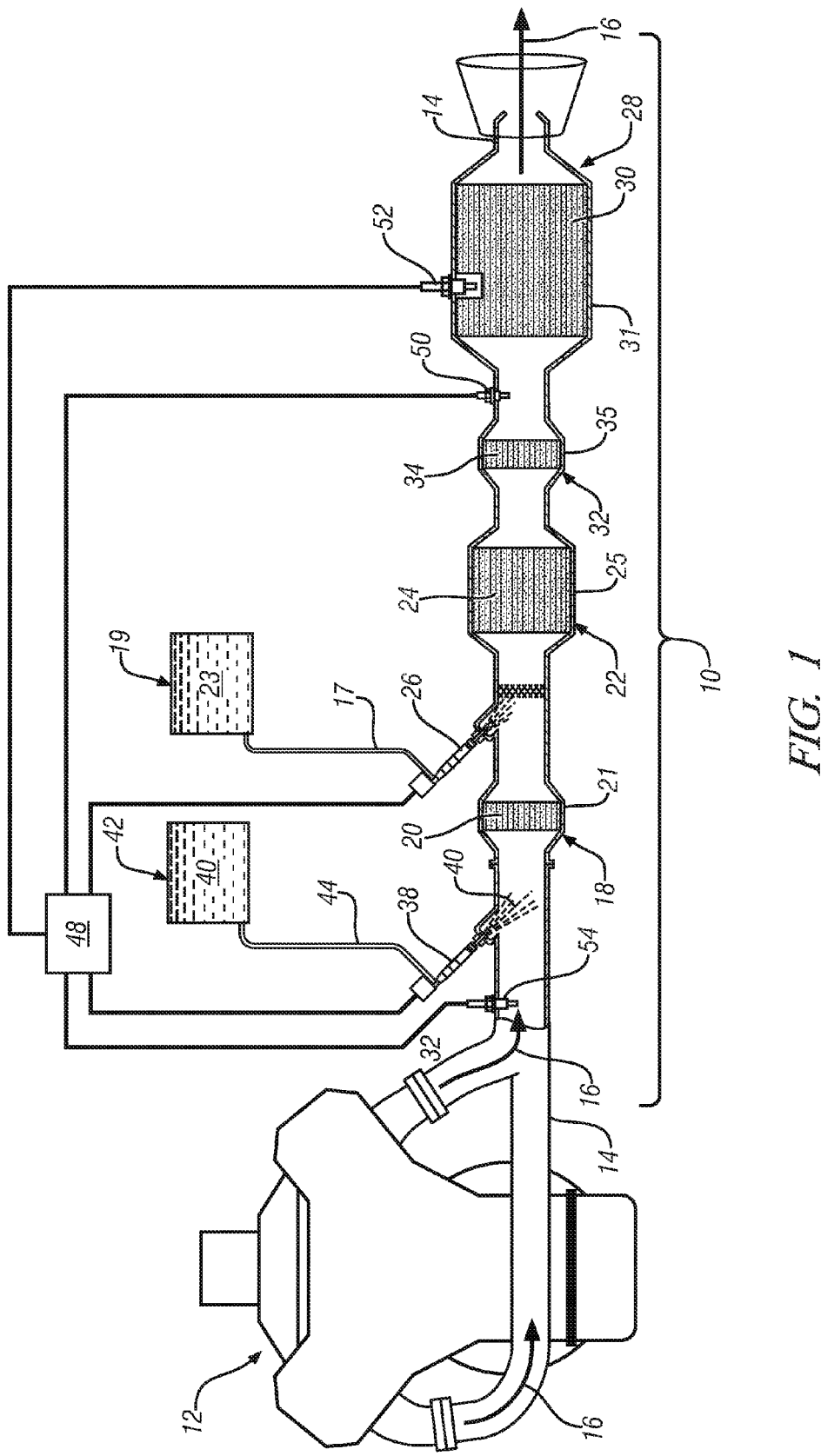
FIG. 1 is a schematic view of an exhaust gas treatment system for an internal combustion engine embodying features of the invention.

The following description is merely exemplary in nature and is not intended to limit the present disclosure, application or uses. It should be understood that throughout the drawings, corresponding reference numerals indicate like or corresponding parts and features.

Referring to FIG. 1, an exemplary embodiment of the invention is directed to an exhaust gas treatment system, referred to generally as 10, for the reduction of regulated exhaust gas constituents emitted by an internal combustion engine 12. It is appreciated that the invention described herein can and may be implemented in various engine systems implementing an exhaust gas particulate filter. Such engine systems may include, but are not limited to, gasoline direct injection systems and homogeneous charge compression ignition engine systems.

The exhaust treatment system 10 includes an exhaust gas conduit 14, which may comprise several segments, that functions to transport exhaust gas 16 from the engine 12 to the various exhaust treatment devices of the exhaust treatment system 10. The exhaust treatment devices may include a first oxidation catalyst device ("OC1") 18. The OC1 may be constructed with a flow-through metal or ceramic monolith substrate 20 that is wrapped in an intumescent or non-intumescent mat (not shown) that expands when heated to secure and insulate the substrate which is packaged in a rigid shell or canister 21 having an inlet and an outlet in fluid communication with the exhaust gas conduit 14. The substrate 20 has an oxidation catalyst compound (not shown) disposed thereon. The oxidation catalyst compound may be applied as a wash coat and my contain platinum group metals such as platinum ("Pt"), palladium ("Pd"), rhodium ("Rh") or other suitable oxidizing catalysts, or combination thereof. The OC1 18 is useful in treating unburned gaseous and non-volatile HC and CO, which are oxidized, in an exothermic reaction, to form carbon dioxide and water.

In an exemplary embodiment, a selective catalytic reduction device ("SCR") 22 may be disposed downstream of the OC1 18. In a manner similar to the OC1, the SCR device 22 may also be constructed with a flow-through ceramic or metal monolith substrate 24 that is wrapped in an intumescent or non-intumescent mat (not shown) that expands when heated to secure and insulate the substrate which is packaged in a rigid shell or canister 25 having an inlet and an outlet in fluid communication with the exhaust gas conduit 14. The substrate 24 has a $NO_x$ reducing catalyst composition such as an SCR catalyst composition (not shown) applied thereto. The SCR catalyst composition preferably contains a zeolite and one or more base metal components such as iron ("Fe"), cobalt ("Co"), copper ("Cu") or vanadium ("V") that can operate efficiently to reduce $NO_x$ constituents in the exhaust gas 16 in the presence of a reductant such as ammonia ("$NH_3$"). The SCR catalyst compound is a temperature resistant catalyst compound that is preferably resistant to HC adsorption and poisoning, as well as high temperature excursions, as has been shown with certain copper based catalyst compounds. The $NH_3$ reductant 23, supplied from reductant supply tank 19 through conduit 17, is injected into the exhaust gas conduit 14 at a location upstream of the SCR device 22 using an injector 26 that is in fluid communication with conduit 14, or other suitable method of delivery of the reductant to the exhaust gas 16. The reductant may be in the form of a gas, a liquid or an aqueous urea solution and may be mixed with air in the injector 26 to aid in the dispersion of the injected spray.

In an exemplary embodiment, an exhaust gas filter assembly ("PF") 28 is located within the exhaust gas treatment system 10, downstream of the SCR device 22 and operates to filter the exhaust gas 16 of carbon and other exhaust born particulates. The PF device 28 may be constructed using a ceramic wall flow monolith exhaust gas filter 30 that is wrapped in an intumescent or non-intumescent mat (not shown) that expands, when heated to secure and insulate the filter which is packaged in a rigid, heat resistant shell or canister 31, having an inlet and an outlet in fluid communication with exhaust gas conduit 14. Exhaust gas 16 entering the exhaust gas filter 30 is forced to migrate through porous, adjacently extending walls and it is through this mechanism that the exhaust gas is filtered of carbon and other particulates. The filtered particulates are deposited within the exhaust gas filter 30 and, over time, will have the effect of increasing the exhaust gas backpressure experienced by the engine 12. It is appreciated that the ceramic wall flow monolith exhaust gas filter 30 is merely exemplary in nature and that the PF 28 may include other filter devices such as wound or packed fiber filters, open cell foams, sintered metal fibers, etc.

In an exemplary embodiment, the increase in exhaust gas backpressure caused by the accumulation of particulate matter requires that the PF device 28 be periodically cleaned, or regenerated. Regeneration involves the oxidation or burning of the accumulated carbon and other particulates in what is typically a high temperature (>600° C.) environment. For regeneration purposes, a second oxidation catalyst device ("OC2") 32 is disposed upstream of the PF device 28, between the PF device and the SCR device 22. The OC2 32 may be located in a separate canister 34, FIG. 1 or, in another embodiment, it may be located within the PF canister 31, FIG. 2. Like the OC1 18, the OC2 32 may include a flow-through metal or ceramic monolith substrate 34 that is wrapped in an intumescent or non-intumescent mat (not shown) that expands when heated to secure and insulate the substrate in canister 35; or 31 in the case of mounting in the PF 28. The substrate 34 has an oxidation catalyst compound (not shown)

disposed thereon. The oxidation catalyst compound may be applied as a wash coat and may contain platinum group metals such as platinum ("Pt"), palladium ("Pd"), rhodium ("Rh") or other suitable oxidizing catalysts, or combination thereof.

As illustrated in FIG. 1, disposed upstream of OC1 18 and SCR device 22, in fluid communication with the exhaust gas 16 in the exhaust gas conduit 14, is an HC or fuel injector 38. The fuel injector 38, in fluid communication with HC supply 40 in fuel supply tank 42 through fluid conduit 44, is configured to introduce unburned HC 40 into the exhaust gas stream upstream of OC1 18 and the SCR device 22. A controller such as vehicle controller 48 is operably connected to, and monitors, the exhaust gas treatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality. In an exemplary embodiment, a backpressure sensor 50, located upstream of PF device 28, is configured to generate a signal indicative of the carbon and particulate loading in the ceramic wall flow monolith exhaust gas filter 30. Upon a determination that the backpressure has reached a predetermined level indicative of the need to clean or regenerate the exhaust gas filter 30 of the PF device 28, the controller 48 activates the fuel injector 38 to inject HC 40 to the exhaust gas 16, as described. In an exemplary embodiment, the OC1 18 has a volume that represents 20% to 40% of the engine displacement and includes a catalyst compound loading that is sufficiently active to oxidize only a portion of the HC that is injected by the fuel injector 38. The OC1 18 is configured to oxidize only the portion of injected HC 46 that will result in an increase in the temperature of the exhaust gas 16 to a first exhaust gas temperature of about 450° C. to 500° C. upstream of the SCR device 22. At that temperature the SCR device 22 will not absorb unburned HC 46 that has passed through OC1 18 in an un-oxidized state thereby avoiding poisoning and deactivation of the SCR catalyst composition. Additionally, temperatures in the range of 450° C. to 500° C. will not result in thermal degradation of the temperature resistant SCR catalyst composition resulting in reliable, long-term $NO_x$ reduction performance from the exhaust treatment system 10.

The remaining portion of injected HC 40 that passes through the SCR device 22 is thoroughly mixed with the exhaust gas 16 as a result of its passage therethrough. Following its exit from the SCR device 22 the well mixed and vaporized HC/exhaust gas mixture enters the OC2 32 where the remaining portion of the unburned, injected HC 40 is oxidized prior to its entry into the PF 28. In an exemplary embodiment, the OC2 32 has a volume that represents 25% to 45% of the engine displacement and includes a catalyst compound loading that is sufficiently active to oxidize the remaining portion of the HC 40 that is injected by the fuel injector 38 but that has passed or slipped through the OC1 18. Oxidation of the HC 40 in OC2 32 will result in an increase in the temperature of the exhaust gas 16 to a second exhaust gas temperature of about 600° C. to 650° C. upstream of the PF device 28; a temperature that is suitable for combustion of the carbon and particulate matter in the ceramic wall flow monolith exhaust gas filter 30. The controller 48 may monitor the temperature of the heated exhaust gas in the ceramic wall flow monolith filter 30 through temperature sensor 52, as well as the exhaust gas temperature upstream of the OC1 18 through temperature sensor 54 and adjust the rate of HC delivery of injector 38 to maintain the desired exhaust gas temperatures as indicated.

Figure 2:
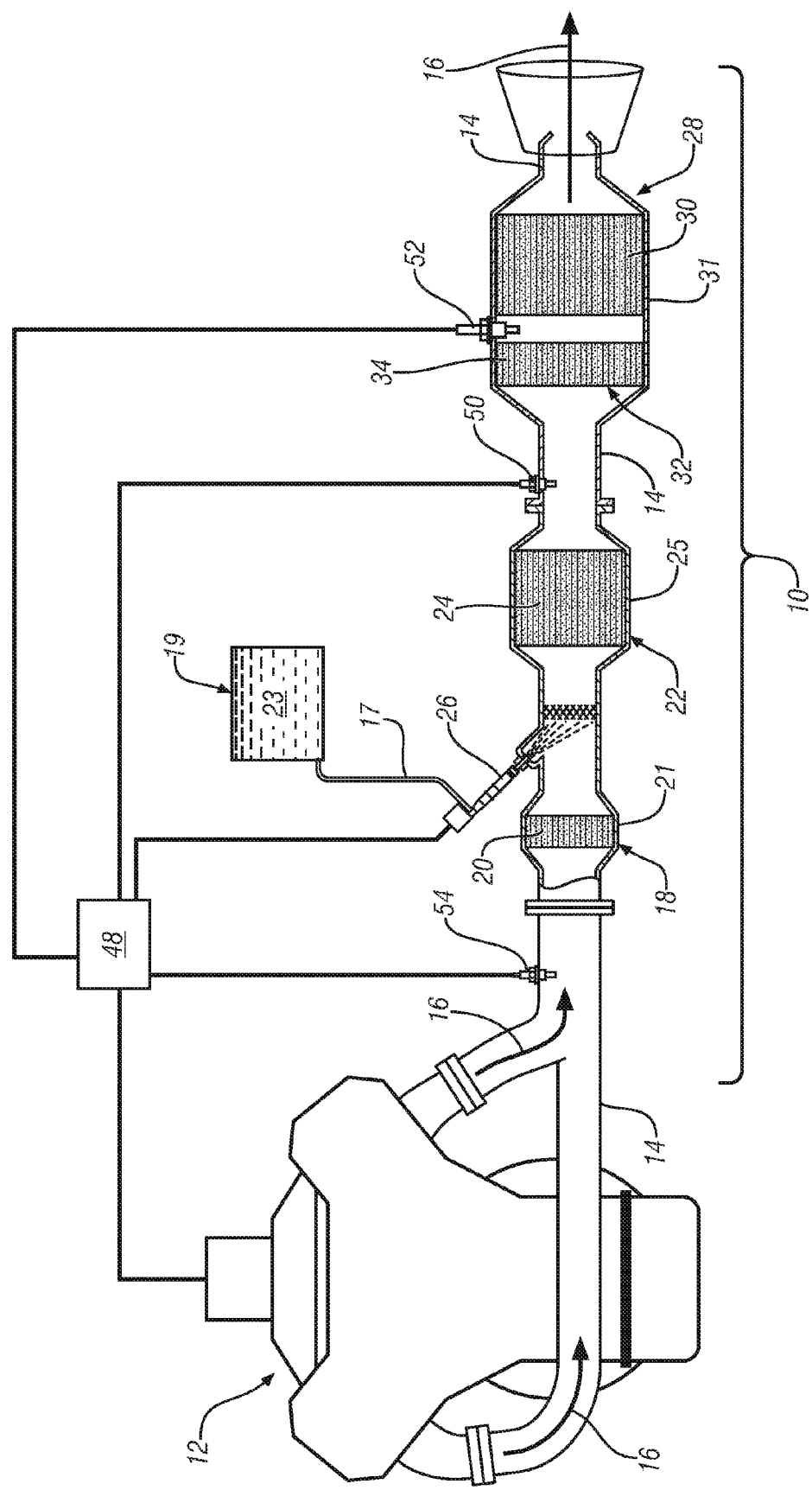
FIG. 2 is a schematic view of another embodiment of an exhaust gas treatment system for an internal combustion engine embodying features of the invention.

In another exemplary embodiment, FIG. 2, it is contemplated that, in some circumstances the fuel injector 38 may be dispensed with in favor of engine control of the hydrocarbon levels in the exhaust gas 16. In such an instance the controller 48 is operably connected to, and monitors, the exhaust gas treatment system 10 through signal communication with a number of sensors such as backpressure sensor 50. The backpressure sensor 50 is configured to generate a signal indicative of the carbon and particulate loading in the ceramic wall flow monolith exhaust gas filter 30 and, upon a determination that the backpressure has reached a predetermined level indicative of the need to clean or regenerate the PF 28, the controller 48 will adjust the engine timing and rate/frequency of fueling to the engine 12 to deliver excess, unburned fuel (HC) into the exhaust gas conduit 14 for mixing with the exhaust gas 16. As described above, the OC1 18 has a volume that represents 20% to 40% of the engine displacement and includes a catalyst compound loading that is sufficiently active to oxidize only a portion of the HC that exits the engine 12 in the exhaust gas 16. The OC1 18 is configured to oxidize only the portion of excess HC in the exhaust gas that will result in an increase in the temperature of the exhaust gas 16 to a first gas temperature of about 450° C. to 500° C. upstream of the SCR device 22. At that temperature the SCR device 22 will not absorb unburned HC that has passed through OC1 18 in an un-oxidized state thereby avoiding poisoning and deactivation of the SCR catalyst composition. Additionally, temperatures in the range of 450° C. to 500° C. will not result in thermal degradation of the SCR catalyst composition resulting in reliable long-term $NO_x$ reduction performance from the exhaust treatment system 10.

The remaining portion of excess HC that passes through the SCR device 22 enters the OC2 32 where it is oxidized prior to its entry into the exhaust gas filter 30 of the PF device 28. In an exemplary embodiment, the OC2 32 has a volume that represents 25% to 45% of the engine displacement and includes a catalyst compound loading that is sufficiently active to oxidize the remaining portion of the HC that exits the engine 12 in the exhaust gas 16, but that has passed or slipped through the OC1 18 and will result in an increase in the temperature of the exhaust gas 16 to a second exhaust gas temperature of about 600° C. to 650° C. upstream of the PF device 28 that is suitable for combustion of the carbon and particulate matter in the ceramic wall flow monolith exhaust gas filter 30. The controller 48 may monitor the temperature of the heated exhaust gas temperature in the exhaust gas filter 30 through temperature sensor 52, as well as the exhaust gas temperature upstream of the OC1 18 through temperature sensor 54 and adjust the engine timing and rate/frequency of fueling to the engine 12 to maintain the desired exhaust gas temperatures as indicated.

The use of a small OC1 18 upstream of the SCR device 22 in combination with a small OC2 32 downstream of the SCR device 22 but upstream of the exhaust gas filter 30 of the PF device 28 provides for high $NO_x$ conversion efficiency during regeneration of the PF 28 as well as improved SCR catalyst durability due to the reduction or elimination of thermal damage to the SCR catalyst. By moving a portion of the HC oxidation event to a location that is closely adjacent to the PF device 28, significant thermal loss from the exhaust gas 16 through the various components and devices of the exhaust gas treatment system 10 can also be avoided thereby reducing the consumption of HC during regeneration of the PF device 28 and improving fuel efficiency of the engine 12.

Figure 3:
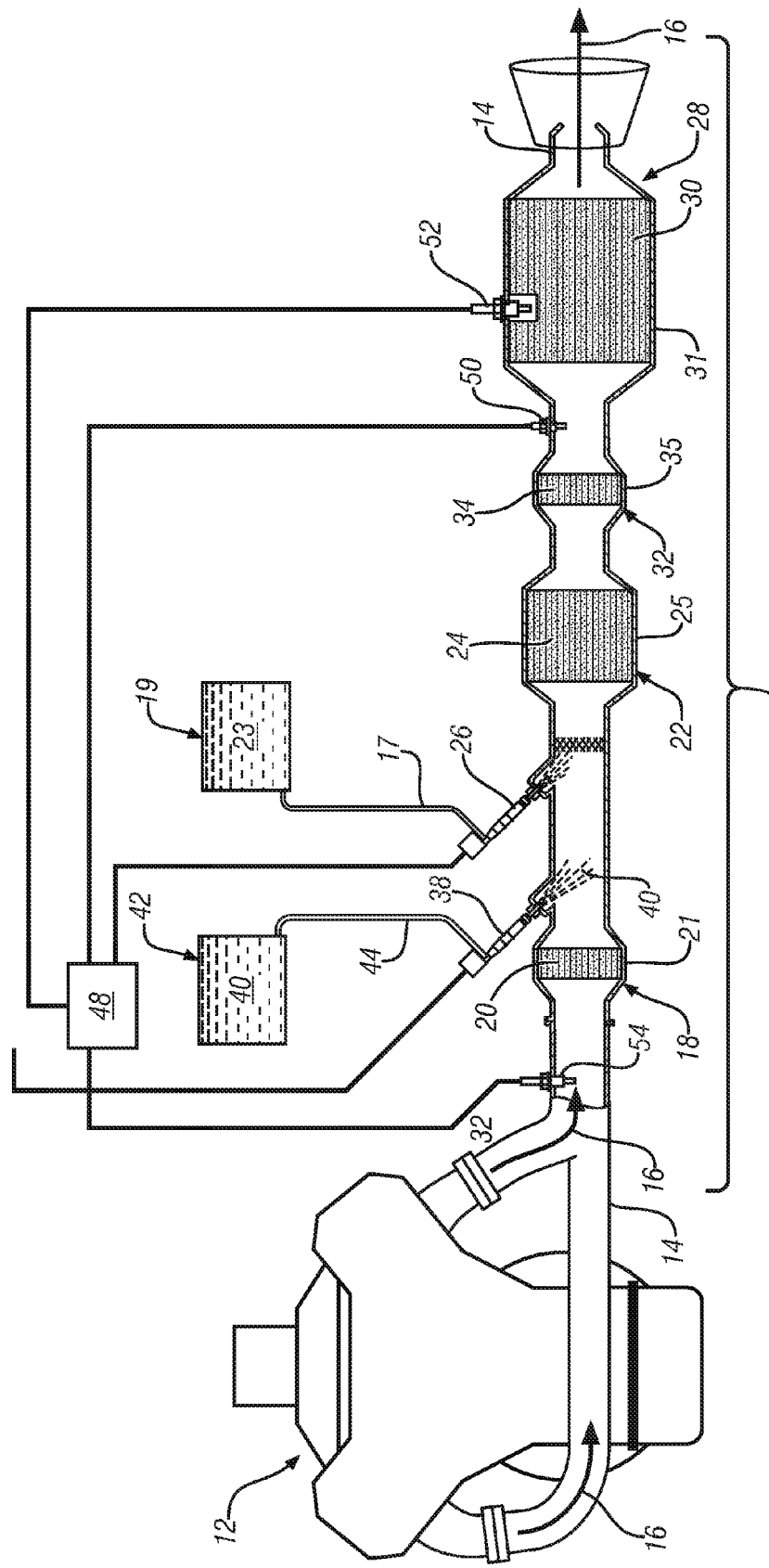
FIG. 3 is a schematic view of another embodiment of an exhaust gas treatment system for an internal combustion engine embodying features of the invention.

In another exemplary embodiment illustrated in FIG. 3, it may be advantageous is some applications to avoid raising the temperature of the exhaust gas 16 until it has passed through the SCR device 22 in order to extend the durability of the device. In such an instance, disposed downstream of OC1 18, in fluid communication with the exhaust gas 16 in the exhaust gas conduit 14, is an HC or fuel injector 38. The fuel injector 38, in fluid communication with HC supply 40 in fuel supply tank 42 through fluid conduit 44, is configured to inject unburned HC 40 into the exhaust gas stream upstream of SCR device 22. As earlier described, a backpressure sensor 50, located upstream of PF device 28, generates a signal indicative of the carbon and particulate loading in the ceramic wall flow monolith exhaust gas filter 30. Upon a determination that the backpressure has reached a predetermined level indicative of the need to clean or regenerate the exhaust gas filter 30 of the PF device 28, the controller 48 activates the fuel injector 38 to inject HC 40 to the exhaust gas 16. The injected HC 40 will pass through the SCR device 22 where it is thoroughly mixed with the exhaust gas 16. Following its exit from the SCR device 22 the well mixed HC/exhaust gas mixture enters the OC2 32 where it is oxidized prior to its entry into the PF 28. In this exemplary embodiment, the OC2 32 has a volume and includes a catalyst compound loading that is sufficiently active to oxidize the HC 40 that is injected by the fuel injector 38 and will result in an increase in the temperature of the exhaust gas 16 to about 600° C. to 650° C. upstream of the PF device 28; a temperature that is suitable for combustion of the carbon and particulate matter in the ceramic wall flow monolith exhaust gas filter 30. The controller 48 may monitor the temperature of the heated exhaust gas in the ceramic wall flow monolith filter 30 through temperature sensor 52, as well as the exhaust gas temperature upstream of the OC1 18 through temperature sensor 54 and adjust the rate of HC delivery of injector 38 to maintain the desired exhaust gas temperatures as indicated. In this exemplary embodiment, the OC1 is utilized only for the reduction of CO and engine-out HC.

Figure 4:
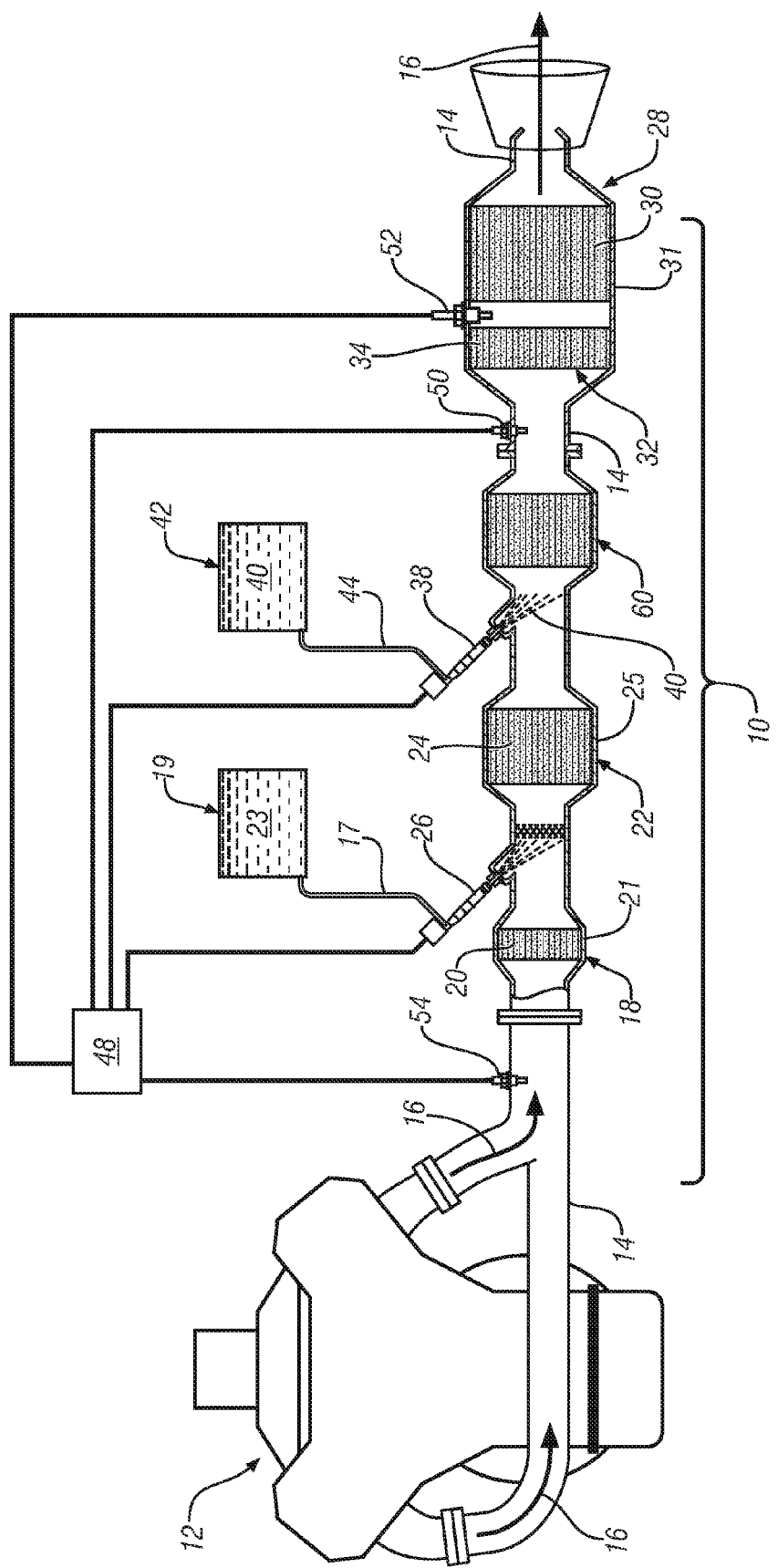
FIG. 4 is a schematic view of yet another embodiment of an exhaust gas treatment system for an internal combustion engine embodying features of the invention.

In yet another exemplary embodiment illustrated in FIG. 4, it may also be advantageous is some applications to avoid exposing a portion of the SCR device 22 to unburned HC as well as to avoid raising the temperature of the exhaust gas 16 until it has passed through the SCR in order to further extend the durability of the device. In such an instance, disposed downstream of OC1 18 and SCR device 22, in fluid communication with the exhaust gas 16 in the exhaust gas conduit 14 is a second SCR device 60. An HC or fuel injector 38, in fluid communication with HC supply 40 in fuel supply tank 42 through fluid conduit 44, is configured to introduce unburned HC 40 into the exhaust gas stream between the SCR device 60 and the SCR device 22. In this configuration, SCR 22 avoids the possibility of HC contamination while SCR device 60 continues to be available for thorough mixing of the injected HC 40 with the exhaust gas 16. As earlier described, a backpressure sensor 50, located upstream of PF device 28, generates a signal indicative of the carbon and particulate loading in the ceramic wall flow monolith exhaust gas filter 30. Upon a determination that the backpressure has reached a predetermined level indicative of the need to clean or regenerate the exhaust gas filter 30 of the PF device 28, the controller 48 activates the fuel injector 38 to inject HC 40 to the exhaust gas 16. The injected HC 40 will pass through the SCR device 60 where it is thoroughly mixed with the exhaust gas 16. Following its exit from the SCR device 60 the well mixed HC/exhaust gas mixture enters the OC2 32 where it is oxidized prior to its entry into the PF 28. In this exemplary embodiment, the OC2 32 has a volume and includes a catalyst compound loading that is sufficiently active to oxidize the HC 40 that is injected by the fuel injector 38 and will result in an increase in the temperature of the exhaust gas 16 to about 600° C. to 650° C. upstream of the PF device 28; a temperature that is suitable for combustion of the carbon and particulate matter in the ceramic wall flow monolith exhaust gas filter 30. The controller 48 may monitor the temperature of the heated exhaust gas in the ceramic wall flow monolith filter 30 through temperature sensor 52, as well as the exhaust gas temperature upstream of the OC1 18 through temperature sensor 54 and adjust the HC delivery rate of injector 38 to maintain the desired exhaust gas temperatures as indicated. In this exemplary embodiment, the OC1 is utilized only for the reduction of CO and engine-out HC.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for an internal combustion engine, the system comprising:
   an exhaust gas conduit in fluid communication with, and configured to receive an exhaust gas from, the internal combustion engine and to conduct the exhaust gas between a plurality of devices of the exhaust gas treatment system;
   a hydrocarbon injector connected to the exhaust gas conduit in fluid communication with the exhaust gas for delivery of hydrocarbon thereto and formation of an exhaust gas and hydrocarbon mixture;
   a reductant injector connected to the exhaust gas conduit and in fluid communication with the exhaust gas for delivery of a reductant thereto;
   a selective catalyst reduction device disposed in fluid communication with the exhaust gas conduit downstream of the hydrocarbon injector and reductant injector and configured to receive and to mix the exhaust gas and hydrocarbon mixture and to reduce $NO_x$ constituents therein,
   a first oxidation catalyst device disposed in fluid communication with the exhaust gas conduit downstream of the selective catalyst reduction device and configured to oxidize the exhaust gas and hydrocarbon mixture to raise the temperature of the exhaust;
   a second oxidation catalyst device disposed in fluid communication with the exhaust gas conduit upstream of the selective catalyst reduction device and configured to oxidize carbon monoxide and engine-out hydrocarbon;
   a particulate filter assembly having an exhaust gas filter for collection of carbon and particulates disposed therein, in fluid communication with the exhaust gas conduit and located downstream of the first oxidation catalyst device for receipt of the heated exhaust gas and combustion of carbon and particulates collected in the exhaust gas filter,
   wherein the hydrocarbon injector is connected to the exhaust gas conduit upstream of the selective catalyst reduction device and the second oxidation catalyst, and the reductant injector is connected to the exhaust gas conduit upstream of the selective catalyst reduction device and downstream of the second oxidation catalyst device;

a temperature sensor configured for fluid communication with the exhaust gas conduit upstream of the hydrocarbon injector and configured to generate a signal indicative of a temperature of the exhaust gas; and a controller in communication with the temperature sensor and the hydrocarbon injector and configured to adjust the rate of hydrocarbon delivery from the hydrocarbon injector to maintain a desired exhaust gas temperature to burn carbon and particulates in the exhaust gas filter.

2. The exhaust gas treatment system for an internal combustion engine of claim 1, wherein the second oxidation catalyst device upstream of the selective catalyst reduction device has a volume that represents 20% to 40% of the engine displacement and includes a catalyst compound loading that is sufficiently active to oxidize only a portion of the hydrocarbon in the hydrocarbon and exhaust gas mixture and to raise the exhaust gas to a first temperature.

3. The exhaust gas treatment system for an internal combustion engine of claim 2, wherein the first exhaust gas temperature is between 450° and 500° C. upstream of the selective catalyst reduction device.

4. The exhaust gas treatment system for an internal combustion engine of claim 1, wherein the first oxidation catalyst device downstream of the selective catalyst reduction device has a volume that represents 25% to 45% of the engine displacement and includes a catalyst compound loading that is sufficiently active to oxidize the remaining portion of the hydrocarbon in the hydrocarbon and exhaust gas mixture and to raise the exhaust gas temperature to a second temperature.

5. The exhaust gas treatment system for an internal combustion engine of claim 4, wherein the second exhaust gas temperature is between 600° and 650° C. upstream of the particulate filter assembly.

6. The exhaust gas treatment system for an internal combustion engine of claim 1, wherein, the selective catalyst reduction device includes a temperature resistant catalyst compound disposed thereon that is resistant to hydrocarbon adsorption and poisoning.

7. The exhaust gas treatment system for an internal combustion engine of claim 6, wherein the selective catalyst reduction device comprises a catalyst compound comprising a zeolite and one or more base metal components such as iron ("Fe"), cobalt ("Co"), copper ("Cu") or vanadium ("V") that can operate to convert $NO_x$ constituents in the exhaust gas in the presence of a reductant such as ammonia.

8. The exhaust gas treatment system for an internal combustion engine of claim 1, wherein the first oxidation catalyst device is disposed in the particulate filter assembly.

9. The exhaust gas treatment system for an internal combustion engine of claim 1, wherein the catalyst compound in the first oxidation catalyst devices comprises a wash coat containing platinum group metals such as platinum ("Pt"), palladium ("Pd"), rhodium ("Rh") or other suitable oxidizing catalysts, or combination thereof 10. The exhaust gas treatment system for an internal combustion engine of claim 1, further comprising:

a backpressure sensor in fluid communication with the exhaust gas conduit, upstream of the exhaust gas filter and configured to generate a signal indicative of a backpressure of the exhaust gas, wherein the controller is in signal communication with the backpressure sensor and the hydrocarbon injector and configured to activate the hydrocarbon injector to inject hydrocarbon into the exhaust gas when the backpressure has reached a predetermined level indicative of the need to heat the exhaust gas filter to burn carbon and particulates collected therein.

11. The exhaust gas treatment system for an internal combustion engine of claim 10, further comprising:

a second temperature sensor configured for fluid communication with the exhaust gas conduit adjacent the particulate filter assembly and configured to generate a signal indicative of a temperature of the exhaust gas, wherein the controller is in communication with the second temperature sensor and the hydrocarbon injector.

12. An exhaust gas treatment system for an internal combustion engine, the system comprising:

an exhaust gas conduit in fluid communication with, and configured to receive an exhaust gas from, the internal combustion engine and to conduct the exhaust gas between a plurality of devices of the exhaust gas treatment system;

a hydrocarbon injector connected to the exhaust gas conduit and in fluid communication with the exhaust gas for delivery of hydrocarbon thereto and formation of an exhaust gas and hydrocarbon mixture;

a reductant injector connected to the exhaust gas conduit and in fluid communication with the exhaust gas for delivery of a reductant thereto;

a selective catalyst reduction device disposed in fluid communication with the exhaust gas conduit downstream of the hydrocarbon injector and reductant injector and configured to receive and to mix the exhaust gas and hydrocarbon mixture and to reduce $NO_x$ constituents therein;

a first oxidation catalyst device disposed in fluid communication with the exhaust gas conduit downstream of the selective catalyst reduction device and configured to oxidize the exhaust gas and hydrocarbon mixture to raise the temperature of the exhaust; a particulate filter disposed in fluid communication with the exhaust gas conduit downstream of the first oxidation catalyst;

a second oxidation catalyst device disposed in fluid communication with the exhaust gas conduit upstream of the selective catalyst reduction device and configured to oxidize carbon monoxide and engine-out hydrocarbon, wherein the hydrocarbon injector is connected to the exhaust gas conduit upstream of the selective catalyst reduction device and downstream of the second oxidation catalyst device located upstream thereof, and the reductant injector is connected to the exhaust gas conduit upstream of the selective catalyst reduction device and downstream of the hydrocarbon injector;

a first temperature sensor configured for fluid communication with the exhaust gas conduit upstream of the hydrocarbon injector and configured to generate a signal indicative of a temperature of the exhaust gas;

a second temperature sensor configured for fluid communication with the exhaust gas conduit adjacent the particulate filter assembly and configured to generate a signal indicative of a temperature of the exhaust gas; and a controller in communication with the first and second temperature sensors and the hydrocarbon injector and configured to adjust the rate of hydrocarbon delivery from the hydrocarbon injector to maintain a desired exhaust gas temperature to burn carbon and particulates in the exhaust gas filter.

13. An exhaust gas treatment system for an internal combustion engine, the system comprising:

an exhaust gas conduit in fluid communication with, and configured to receive an exhaust gas from, the internal combustion engine and to conduct the exhaust gas between a plurality of devices of the exhaust gas treatment system;
a hydrocarbon injector connected to the exhaust gas conduit and in fluid communication with the exhaust gas for delivery of hydrocarbon thereto and formation of an exhaust gas and hydrocarbon mixture;
a reductant injector connected to the exhaust gas conduit and in fluid communication with the exhaust gas for delivery of a reductant thereto;
a first selective catalyst reduction device disposed in fluid communication with the exhaust gas conduit downstream of the hydrocarbon injector and reductant injector and configured to receive and to mix the exhaust gas and hydrocarbon mixture and to reduce $NO_x$ constituents therein;
a first oxidation catalyst device disposed in fluid communication with the exhaust gas conduit downstream of the first selective catalyst reduction device and configured to oxidize the exhaust gas and hydrocarbon mixture to raise the temperature of the exhaust;
a second oxidation catalyst device disposed in fluid communication with the exhaust gas conduit upstream of the first selective catalyst reduction device and configured to oxidize carbon monoxide and engine-out hydrocarbon; and
a second selective catalyst reduction device located upstream of the hydrocarbon injector and downstream of the second oxidation catalyst device located upstream thereof 14. A method of operating an exhaust gas treatment system for an internal combustion engine comprising an exhaust gas conduit in fluid communication with, and configured to receive an exhaust gas from, the internal combustion engine and to conduct the exhaust gas between a plurality of devices of the exhaust gas treatment system, a hydrocarbon injector connected to the exhaust gas conduit in fluid communication with the exhaust gas for delivery of hydrocarbon thereto and formation of an exhaust gas and hydrocarbon mixture, a reductant injector connected to the exhaust gas conduit and in fluid communication with the exhaust gas for delivery of a reductant thereto, a first oxidation catalyst device disposed in fluid communication with the exhaust gas conduit upstream of the reductant injector, a first selective catalyst reduction device, configured for reduction of components of $NO_x$ in the exhaust gas, disposed in fluid communication with the exhaust gas conduit downstream of the first oxidation catalyst device and the reductant injector, a second oxidation catalyst device disposed in fluid communication with the exhaust gas conduit downstream of the first selective catalyst reduction device, a second selective catalyst reduction device located downstream of the hydrocarbon injector and upstream of the second oxidation catalyst device, and a particulate filter assembly having an exhaust gas filter for collection of carbon and particulates disposed therein, in fluid communication with the exhaust gas conduit and located downstream of the second oxidation catalyst device comprising:
  delivering exhaust gas to the exhaust gas treatment system from the internal combustion engine:
  oxidizing a first portion of the exhaust gas in the first oxidation catalyst to raise the temperature of the exhaust gas to a first temperature;
  passing the exhaust gas through the first selective catalyst reduction device and mixing it therein; delivering hydrocarbon to the exhaust gas through the hydrocarbon injector;
  passing the exhaust gas through the second selective catalyst reduction device and mixing it therein;
  oxidizing a second portion of the exhaust gas in the second oxidation catalyst to raise the temperature of the exhaust gas to a second temperature; and
  delivering the exhaust gas at the second temperature to the particulate filter assembly for combustion of carbon and particulates disposed on the exhaust gas filter.

15. The method of operating an exhaust gas treatment system for an internal combustion engine of claim 14, further comprising:
  locating a temperature sensor in fluid communication with the exhaust gas conduit adjacent the particulate filter assembly and generating a signal indicative of a temperature of the exhaust gas; and
  locating a controller in signal communication with the temperature sensor and the hydrocarbon injector adjusting the rate of hydrocarbon delivery to the exhaust gas to maintain a desired exhaust gas temperature to burn carbon and particulates in the exhaust gas filter.

16. The method of operating an exhaust gas treatment system for an internal combustion engine of claim 15, further comprising applying a temperature resistant catalyst compound on the selective catalyst reduction device that is resistant to hydrocarbon adsorption and poisoning.

* * * * *